United States Patent
Yamazaki (10) Patent No.: US 9,073,216 B2
(45) Date of Patent: Jul. 7, 2015

(54) JOINT MECHANISM AND ROBOT HAVING THE SAME

(71) Applicant: HONDA MOTOR CO., LTD., Tokyo (JP)

(72) Inventor: Yasuhiro Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 13/644,046

(22) Filed: Oct. 3, 2012

(65) Prior Publication Data

US 2013/0104686 A1    May 2, 2013

(30) Foreign Application Priority Data

Oct. 31, 2011    (JP) .................................. 2011-239162

(51) Int. Cl.
  *B25J 17/00*  (2006.01)
  *B25J 17/02*  (2006.01)
  *B25J 18/00*  (2006.01)
  *B25J 9/10*  (2006.01)
  *B25J 15/00*  (2006.01)
  *B25J 19/00*  (2006.01)

(52) U.S. Cl.
  CPC ............ *B25J 17/00* (2013.01); *Y10T 74/20329* (2015.01); *B25J 9/106* (2013.01); *B25J 15/0009* (2013.01); *B25J 19/0075* (2013.01)

(58) Field of Classification Search
  CPC ........ B25J 9/1612; A61F 2/586; A61F 2/583; A61F 2/58
  USPC ...................... 74/490.01, 490.05; 901/49, 50; 294/86.4; 623/24, 57
  See application file for complete search history.

(56) References Cited

U.S. PATENT DOCUMENTS

| 1,397,654 | A  | * | 11/1921 | Pringle et al. .................... 623/59 |
| 7,581,465 | B2 | * | 9/2009  | Sugawara et al. ........... 74/490.05 |
| 8,747,486 | B2 | * | 6/2014  | Kawasaki et al. ................ 623/64 |
| 2005/0021154 | A1 | * | 1/2005 | Brimalm .......................... 623/64 |
| 2005/0102037 | A1 |   | 5/2005 | Matsuda |

FOREIGN PATENT DOCUMENTS

| JP | 3914157 | 5/2007 |
| JP | 4246052 | 4/2009 |
| JP | 2010-264546 | 11/2010 |

\* cited by examiner

*Primary Examiner* — Justin Krause
(74) *Attorney, Agent, or Firm* — Rankin, Hill & Clark LLP (57) ABSTRACT

In a joint mechanism having at least one joint member connected to a connectable member via a joint to be rotatable in a range between an extended position and a bent position, it is configured to have a movable cover constituting a part of a joint member cover that covers the joint member and the movable cover is moved into interior of remaining portion of the joint member cover as the joint member is rotated relative to the connectable member about the joint from the extended position to the bent position. The joint mechanism can be suitably used in fingers of a hand of a humanoid robot.

9 Claims, 10 Drawing Sheets

JOINT MECHANISM AND ROBOT HAVING THE SAME

BACKGROUND

1. Technical Field

Embodiments of the invention relate to a joint mechanism and a robot having the joint mechanism.

2. Background Art

In a joint mechanism having joint members such as links interconnected by a joint, etc., the joint member is usually protected by a cover to prevent the entry of dust and water droplets into the interior, as taught, for example, by Japanese Patent No. 3914157 ('157).

The reference of '157 proposes a joint mechanism in the shape of fingers of a humanoid type robot hand with covers like finger coats that cover phalangeal members of finger mechanisms.

To be more specific, when each of the phalangeal members of the finger mechanisms is bent through the joints, since the resulting curved portion of the cover is likely to go into a gap between cushioning members under the cover. To deal with it, the joint mechanism of '157 is configured to give the cushioning members to have thickness capable of preventing the curved portion of the cover from being jammed in the gap.

Aside from that, Japanese Patent No. 4246052 ('052) proposes a technique for a similar type joint mechanism using a linear ultrasonic motor as an actuator, in which interphalangeal joints are locally covered by accordion-shaped covers to prevent the entry of dust, etc. into the interior.

SUMMARY

In the reference of '157, the covers are installed only in the vicinity of the phalangeal members and it makes the adjacent covers not interfere with each other at the joint. However, the entry of dust and water droplets at the joint can not be prevented with this configuration, disadvantageously. The reference of '052 prevents the entry of foreign substances at the joint with the use of the accordion-shaped cover, yet the accordion-shaped cover may produce unexpected force against contraction when it is contracted and the force may adversely affect surrounding components.

An object of embodiments of the invention is therefore to overcome the foregoing drawback by providing a joint mechanism and a robot having the joint mechanism that can prevent the entry of foreign substances such as dust and water droplets into the interior, while preventing covers from interfering with each other at a joint.

In order to achieve the object, the embodiment of the invention provides a joint mechanism having at least one joint member connected to a connectable member via a joint to be rotatable in a range between an extended position and a bent position, comprising: a movable cover constituting a part of a joint member cover that covers the joint member, the movable cover being adapted to move into interior of remaining portion of the joint member cover as the joint member is rotated relative to the connectable member about the joint from the extended position to the bent position.

BRIEF DESCRIPTION OF THE DRAWINGS

The above and other objects and advantages will be more apparent from the following description and drawings in which.

DESCRIPTION OF EMBODIMENTS

A joint mechanism and a robot having the joint mechanism according to embodiments of the present invention will now be explained with reference to the attached drawings.

Figure 1:
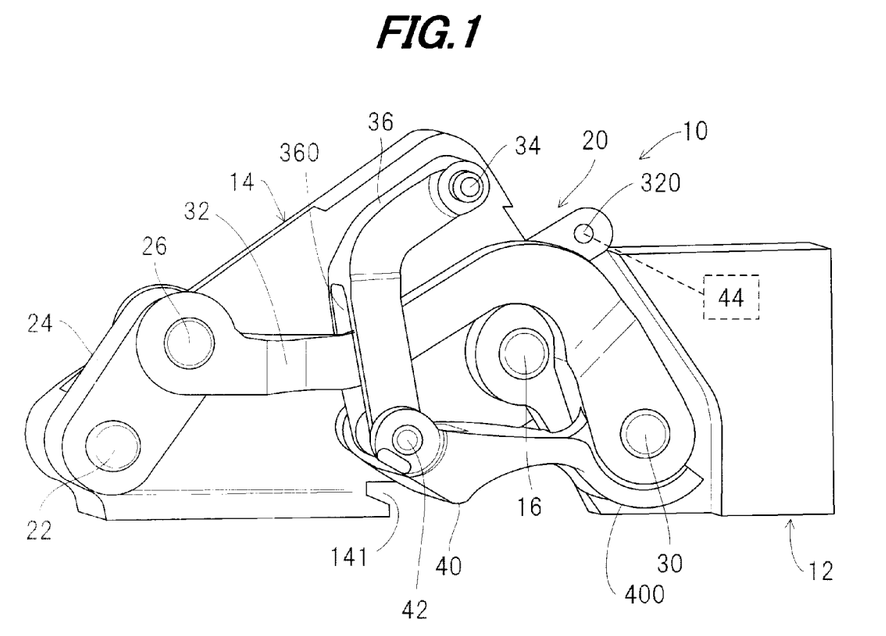
FIG. 1 is a schematic view showing a joint mechanism according to a first embodiment of the invention.

FIG. 1 is a schematic view showing a joint mechanism according to a first embodiment of the invention and FIGS. 2A to 2E are explanatory views showing rotation of the joint mechanism shown in FIG. 1 that is rotated from an extended position to a bent position through a joint.

In FIG. 1, the joint mechanism is indicated by reference numeral 10. The joint mechanism 10 includes a first link 12 and a second link 14 connected to the first link 12. The first and second links 12, 14 are able to be connected at their other ends with another links (not shown).

Each of the first and second links 12, 14 comprises a case member formed by folding a flat plate back at one side (for example, the upper side in FIG. 1, etc.). In FIG. 1, only the plates of the first and second links 12, 14 on the rear side are shown with the plates on the front side removed.

Figures 2A, 2B, 2C, 2D, 2E:
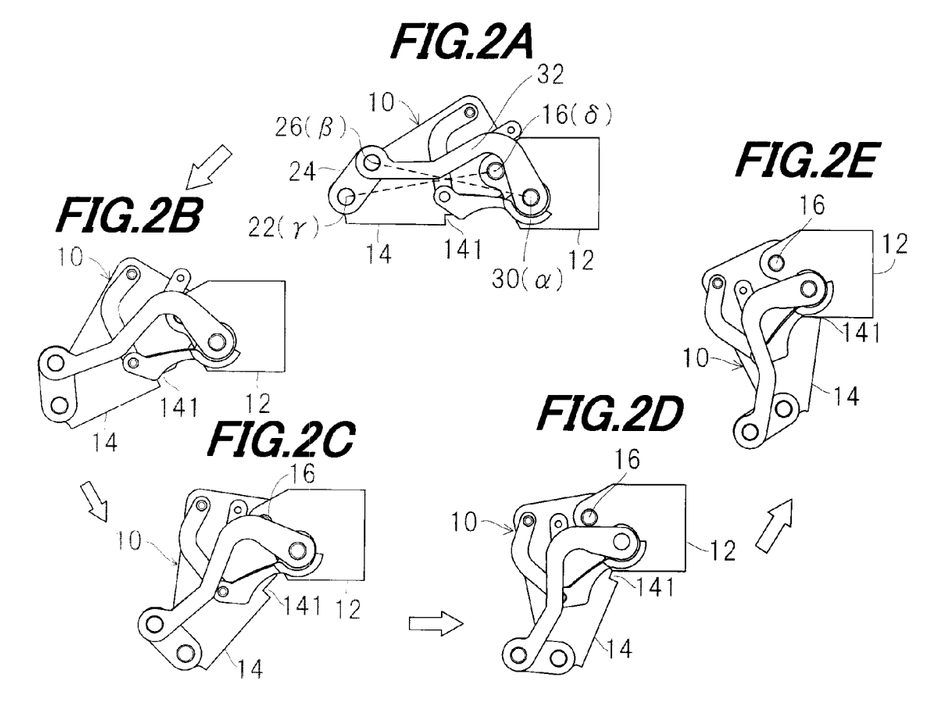
FIGS. 2A-2E are a set of explanatory views showing rotation of the joint mechanism shown in FIG. 1 that is rotated from an extended position to a bent position through a joint.

The second link 14 is connected at its one end (at the right in FIG. 1, etc.) with the first link 12 via a first rotary shaft (joint) 16 to be relatively rotatable. Specifically, as shown in FIGS. 2A to 2E, the first and second links 12, 14 are interconnected to be relatively rotatable in a range including an extended position (FIG. 2A) and bent positions (FIGS. 2B to 2E), more exactly, a range between the extended position and fully bent position (FIG. 2E). A bending angle about the first rotary shaft 16 increases along with the rotation from FIG. 2B to FIG. 2E.

Although not illustrated, a distance between the front plate and rear plate of the first link 12 (in the thickness direction of the paper) is made smaller than that of the second link 14. Specifically, a part of the first link 12 is placed inside the second link 14 and the links 12, 14 are together penetrated by the first rotary shaft 16 so that they can be rotated relative to each other via the first rotary shaft 16.

One side of the second link 14, i.e., the lower portion thereof in FIG. 1, etc., is locally formed with a recess (notch) 141 at a position between the bottom of the second link 14 and the first rotary shaft 16. As shown in FIG. 2, the recess 141 is gradually overlapped with the first link 12 as the second link 14 is rotated relative to the first link 12 about the first rotary shaft 16 from the extended position to the bent position, and eventually reaches a position to be closed or covered by the first link 12.

The joint mechanism 10 further includes a movable cover (sixth link 40 explained later) that covers the recess 141 when the second link 14 is positioned to establish the extended position relative to the first link 12, and a movement mechanism 20 that operates the movable cover to move toward the interior of the second link 14 after passing the recess 141 as the second link 14 is rotated relative to the first link 12 from the extended position to the bent position.

The movement mechanism 20 has a third link 24 that is connected in the interior of the second link 14 with the other end (at the left in FIG. 1, etc.) of the second link 14 on the opposite side from the aforementioned one end thereof to be relatively rotatable via a second rotary shaft 22, a fourth link 32 that is connected at its one end (at the left in FIG. 1, etc.) with the third link 24 to be relatively rotatable via a third rotary shaft 26 positioned away from the second rotary shaft 22 by a predetermined distance and at its other end (at the right in FIG. 1, etc.) with the first link 12 to be relatively rotatable via a fourth rotary shaft 30 positioned away from the first rotary shaft 16 by a distance equivalent to the predetermined distance, and a fifth link 36 that is connected at its one end (at the right in FIG. 1, etc.) with the second link 14 to be relatively rotatable via a fifth rotary shaft 34.

Specifically, the third link 24 is placed between the plates of the second link 14 at the other end of the second link 14 and penetrated together with the second link 14 by the second rotary shaft 22, so that the third link 24 is connected to the second link 14 to be rotatable relative thereto via the second rotary shaft 22. As shown in the simplified illustration, similarly to the first and second links 12, 14, the third link 24 is also composed of two relatively-small (short) plate-shaped members including the front and rear plates.

The fourth link 32 is mostly housed inside the second link 14 and the one end thereof is connected to the third link 24 while the other end thereof is connected to the first link 12 via the fourth rotary shaft 30 to be relatively rotatable. The fourth link 32 comprises a member (longer than the third link 24) having a substantially fork-like shape when viewed from the side, which has one plate in the vicinity of the point of connection with the third link 24 and has two plates of the front and rear plates in the vicinity of the point of connection with the first link 12.

The one end of the fifth link 36 is placed between the plates of the second link 14 and penetrated together with the second link 14 by the fifth rotary shaft 34, so that the fifth link 36 is connected to the second link 14 to be rotatable relative thereto via the fifth rotary shaft 34.

As shown in FIG. 1, the fifth link 36 has a substantially fork-like shape when viewed from the side, in other words, is formed to have one plate in the vicinity of the point of connection with the fifth rotary shaft 34, while branching in the middle and having two plates in the vicinity of the other end. A slit 360 is formed at the fork region. The fourth link 32 is inserted in the slit 360 so that the fourth link 32 intersects with the fifth link 36 (without interfering with each other).

As mentioned in the foregoing, the movable cover includes the sixth link 40 connected to the fifth link 36 and first link 12. The sixth link (movable cover) 40 is connected at its one end (at the left in FIG. 1, etc.) with the fifth link 36 via a sixth rotary shaft 42 to be relatively rotatable and at its other end (at the right in FIG. 1, etc.) with the first link 12 via the fourth rotary shaft 30 to be relatively rotatable. Consequently, the sixth link 40 is configured to cover the recess 141 when the second link 14 is positioned to establish the extended position.

Although not illustrated, the sixth link (movable cover) 40 comprises a wide plate member having width substantially equivalent to a distance between the front and rear plates of the second link 14 when viewed from the side, and the other end of the sixth link 40 is formed with a circular portion. The circular portion is placed between the two plates of the first link 12 to be penetrated therewith by the fourth rotary shaft 30 so that the sixth link 40 is connected to the first link 12 to be relatively rotatable. When the first and second links 12, 14 establish the extended position, the sixth link 40 covers the recess 141.

The circular portion of the sixth link (movable cover) 40 at the other end is continuously formed with a semicircular cover 400 around the fourth rotary shaft 30 so that the cover 400 covers the bottom side (in FIG. 1, etc.) facing the exterior of the first link 12 around the fourth rotary shaft 30.

Although not illustrated, the cover 400 has width substantially equivalent to the distance between the two plates of the first link 12 in the axial direction (in the thickness direction of the paper) in the surroundings of the fourth rotary shaft 30. Consequently, the cover 400 is configured to cover a gap between the two plates of the first link 12 on the bottom side in the vicinity of the fourth rotary shaft 30.

The joint mechanism 10 further includes a rotating force providing unit (rotating force provider) 44 that, in order to relatively rotate the links from the extended position to the bent position, rotates the fourth link 32 through the fourth rotary shaft 30 in a predetermined direction (which is counterclockwise in FIG. 1, etc., in this case and clockwise in the case where the links are operated back to the extended position so as to rotate the third link 24 through the second rotary shaft 22 in the same direction as the predetermined direction (counterclockwise). The fourth link 32 is branched in the middle and the branched portion is formed with an engagement hole 320. The rotating force providing unit 44 is connected to the fourth link 32 through the engagement hole 320.

The rotating force providing unit 44 has, for instance, a hydraulic pressure cylinder including a piston that moves in the interior in response to supplied hydraulic pressure (pressure of incompressible operating oil (oil pressure)) and a rod connected to the piston (neither shown) and is configured to reciprocate in the cylinder along its axis direction. The first link 12 also functions as a cylinder body of the hydraulic pressure cylinder, so that the hydraulic pressure cylinder (rotating force provider) 44 can be accommodated in the interior of the first link 12.

The rod of the rotating force providing unit 44 is connected to the fourth link 32 through the engagement hole 320. The rotating force providing unit 44 serves as an actuator that can rotate the second link 14 through the third link 24 in the same direction as the predetermined direction by moving the fourth link 32 forward and backward.

With the above configuration, as shown in FIG. 2, when the fourth link 32 is rotated in the predetermined direction (counterclockwise direction in FIG. 1, etc.) by the rotating force providing unit 44, the movement mechanism 20 rotates the second link 14 through the third link 24 in the same direction as the predetermined direction so that the recess 141 is moved into the interior of the first link 12 and the sixth link (movable cover) 40 is moved into the interior (the upper portion in FIG. 1, etc.) of the second link 14 after passing the recess 141 formed at the second link 14.

The joint mechanism 10 further includes a cross-link mechanism 46 having the second link 14 (link a) and fourth link 32 (link b) as shown in FIG. 2A, in which the second and fourth links 14, 32 are interconnected by the fourth rotary shaft 30 (α) and third rotary shaft 26 (β) and also by the second rotary shaft 22 (γ) and first rotary shaft 16 (δ), and a line connecting the fourth rotary shaft 30 (α) and third rotary shaft 26 (β) crosses a line connecting the second rotary shaft 22 (γ) and first rotary shaft 16 (δ). In the thus-configured cross-link mechanism 46, at least one of the second and fourth links 14, 32, more exactly the second link 14 comprises the case member.

Although not illustrated, the outsides of the first and second links 12, 14 are provided with covers made of resin material such as urethane rubber. Further, the first to sixth links 12, 14, 24, 32, 36, 40 are made of rigid body like metal.

As set out in the forgoing, in the first embodiment, it is configured to have the first and second links 12, 14 interconnected to be relatively rotatable via the first rotary shaft (joint) 16; the recess 141 locally formed at one side of the second link 14 to be closed when the second link 14 is rotated relative to the first link 12 from the extended position to the bent position; the sixth link (movable cover) 40 covering the recess 141 when it is in the extended position; and the movement mechanism 20 operating the sixth link 40 to move toward the interior of the second link 14 after passing the recess 141 as the second link 14 is relatively rotated from the extended position to the bent position. With this, it becomes possible to prevent the entry of foreign substances such as dust and water droplets into the interior of the joint mechanism 10, while preventing the covers from interfering with each other at the first rotary shaft 16.

Further, the movement mechanism 20 includes the third link 24 connected to the second link 14 to be relatively rotatable via the second rotary shaft 22; the fourth link 32 connected to the third link 24, etc., to be relatively rotatable; and the fifth link 36 connected to the second link 14 to be relatively rotatable, and the movable cover includes the sixth link 40 connected to the fifth link 36, etc., to be relatively rotatable; and the movement mechanism 20 operates the sixth link 40 to move toward the interior of the second link 14 after passing the recess 141 when the fourth link 32 is rotated in the predetermined direction. With this, it becomes possible to prevent the entry of foreign substances such as dust and water droplets into the interior of the joint mechanism 10, while preventing the covers from interfering with each other at the first rotary shaft 16 (joint) further reliably.

Further, the sixth link 40 is connected to the cover 400 that covers the surroundings of the fourth rotary shaft 30, the movement mechanism 20 includes the rotating force provider 44 that rotates the fourth link 32 in the predetermined direction, and the second link 14 comprises the case member that accommodates the third to sixth links 24, 32, 36, 40. With this, it becomes possible to prevent the entry of foreign substances such as dust and water droplets into the interior of the joint mechanism 10 further reliably with simple structure.

Further, it is configured to have the cross-link mechanism 46 in which at least one of the second and fourth links 14, 32, more exactly the second link 14 comprises the case member. With this, since the cross-link mechanism 46 can be accommodated in the case member, compared to the case where a cover is installed around the cross-link mechanism, the accommodating space can be easily ensured and it becomes possible to enhance flexibility in design.

Figure 3:
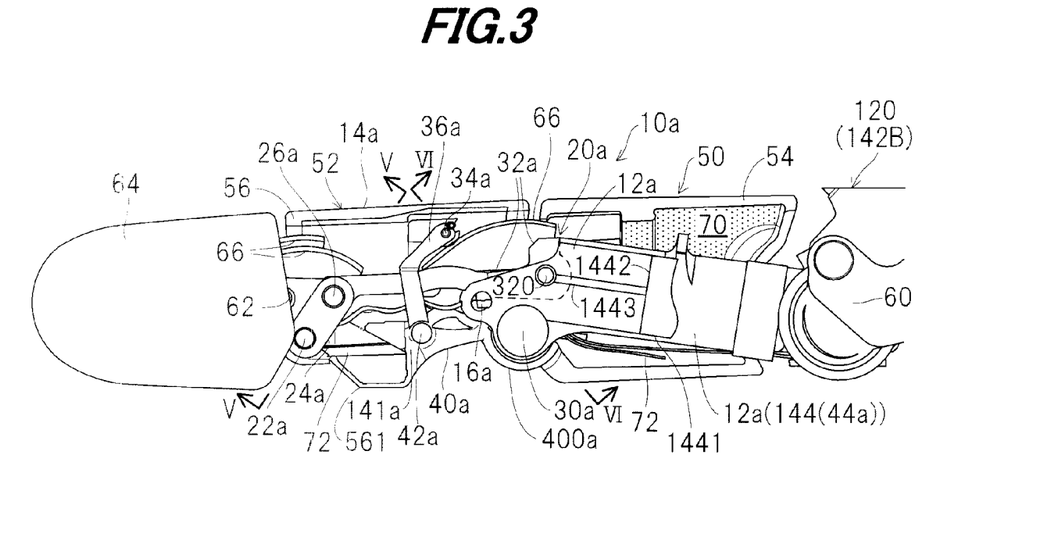
FIG. 3 is a schematic view showing a joint mechanism according to a second embodiment of the invention.
Figure 4:
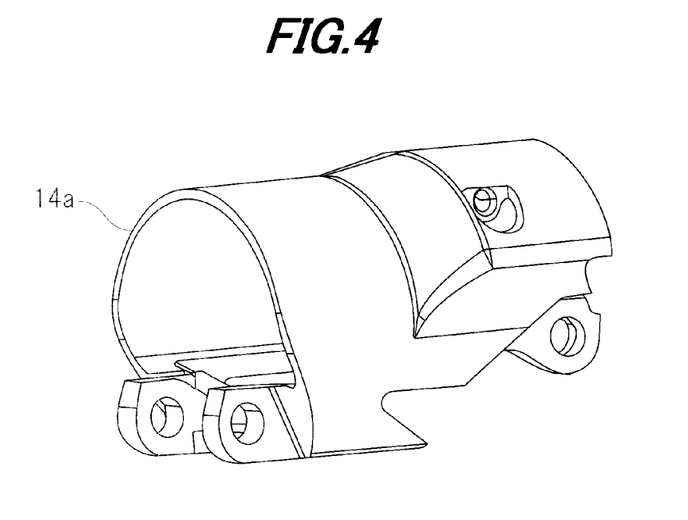
FIG. 4 is a perspective view schematically showing a second link of FIG. 3.
Figure 5:
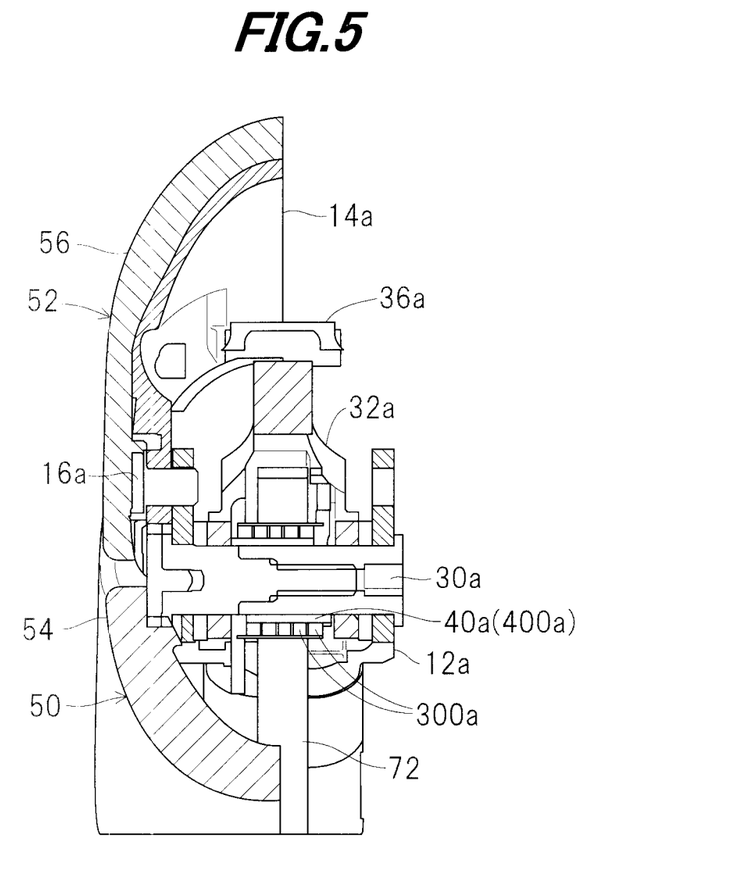
FIG. 5 is a cross-sectional view taken along line V-V of FIG. 3.
Figure 6:
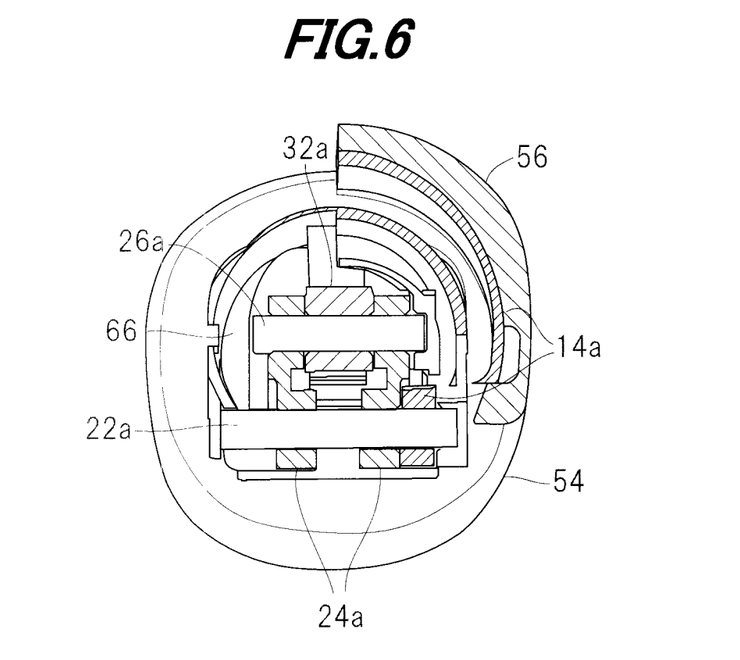
FIG. 6 is a cross-sectional view taken along line VI-VI of FIG. 3.
Figure 7:
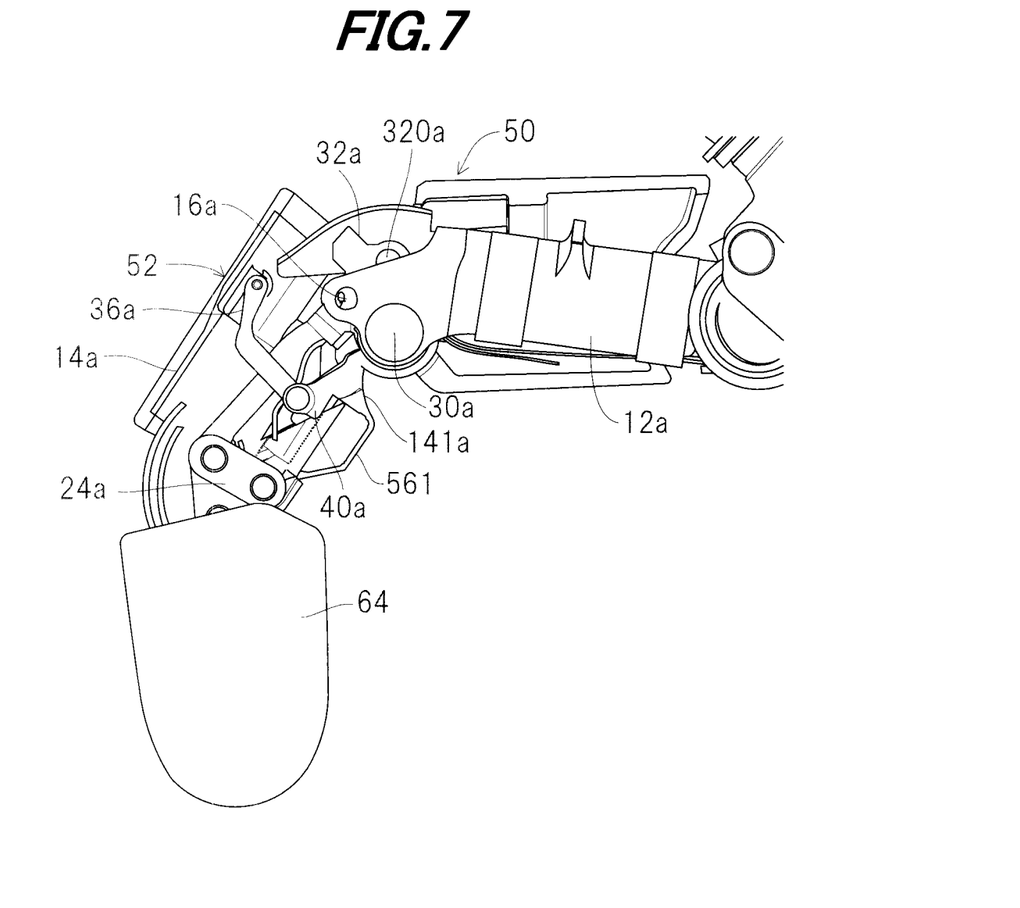
FIG. 7 is an explanatory view showing the joint mechanism shown in FIG. 3 that is rotated from an extended position to a bent position through a joint.
Figure 8:
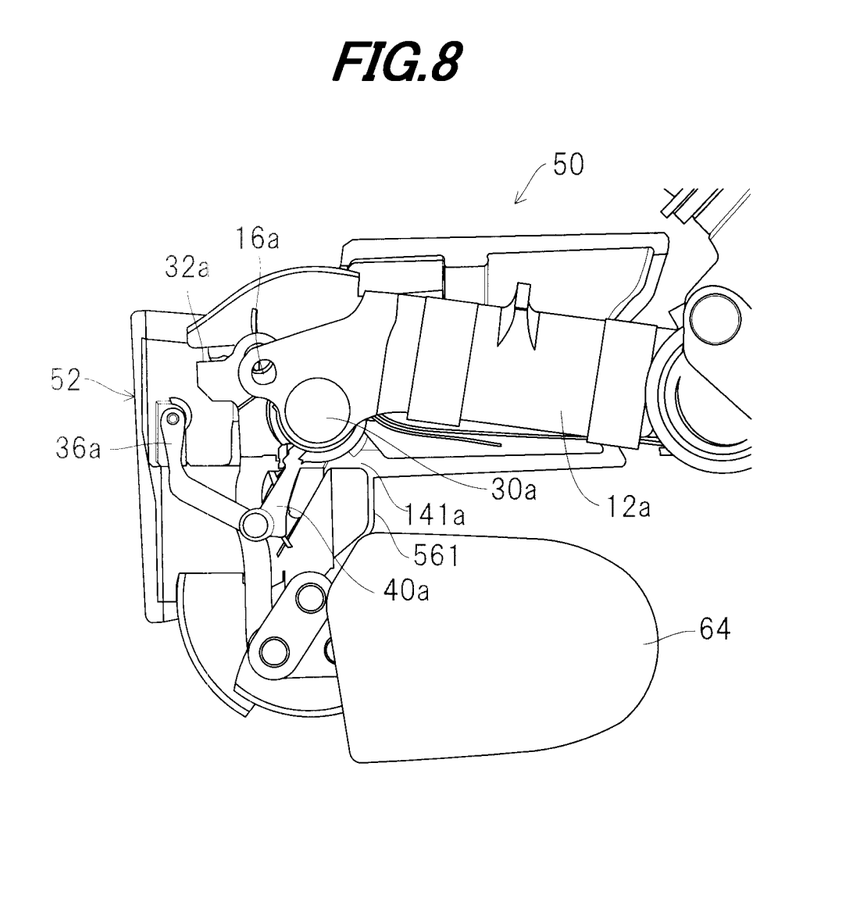
FIG. 8 is an explanatory view similarly showing the joint mechanism shown in FIG. 3 that is rotated from the extended position to the bent position through the joint.
Figure 9:
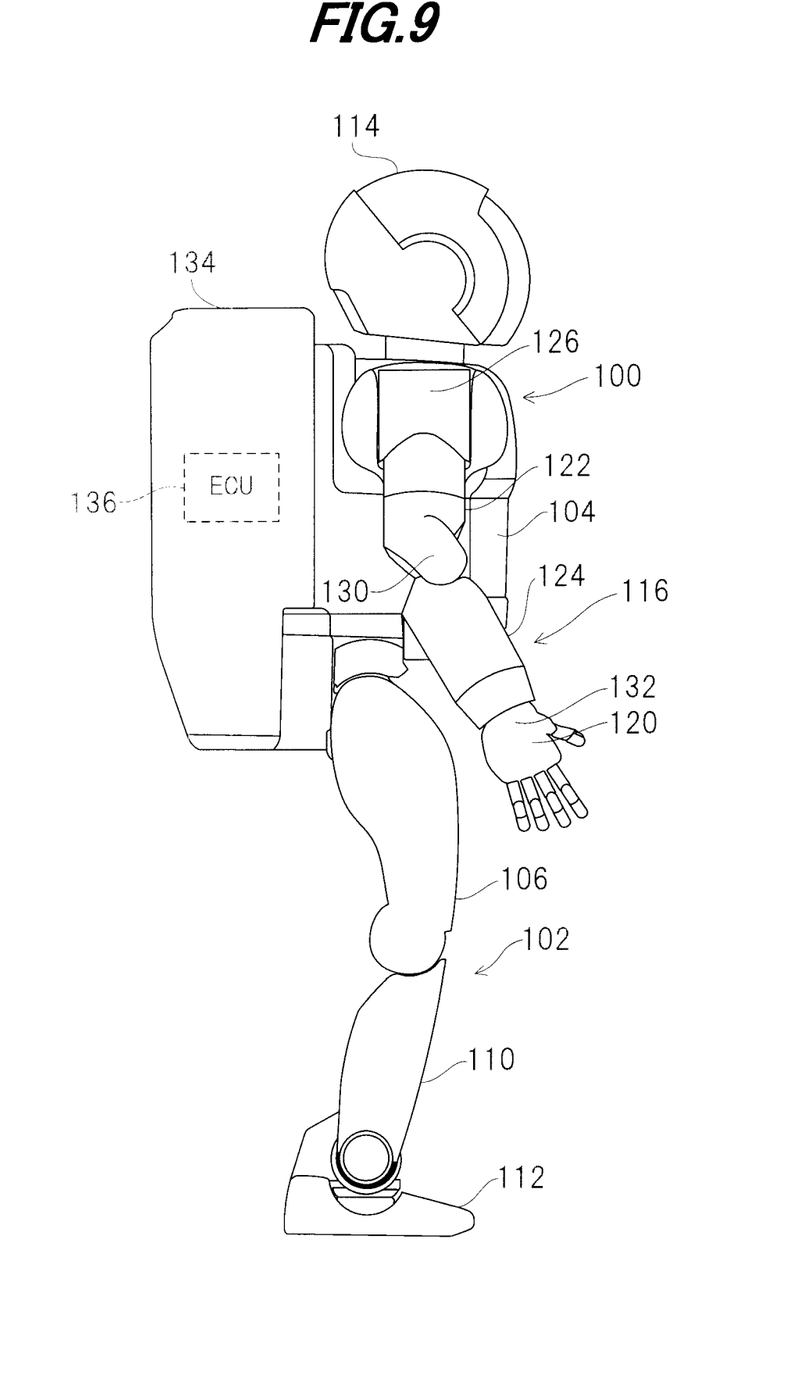
FIG. 9 is a side view of a humanoid robot having the joint mechanism shown in FIG. 3.
Figure 10:
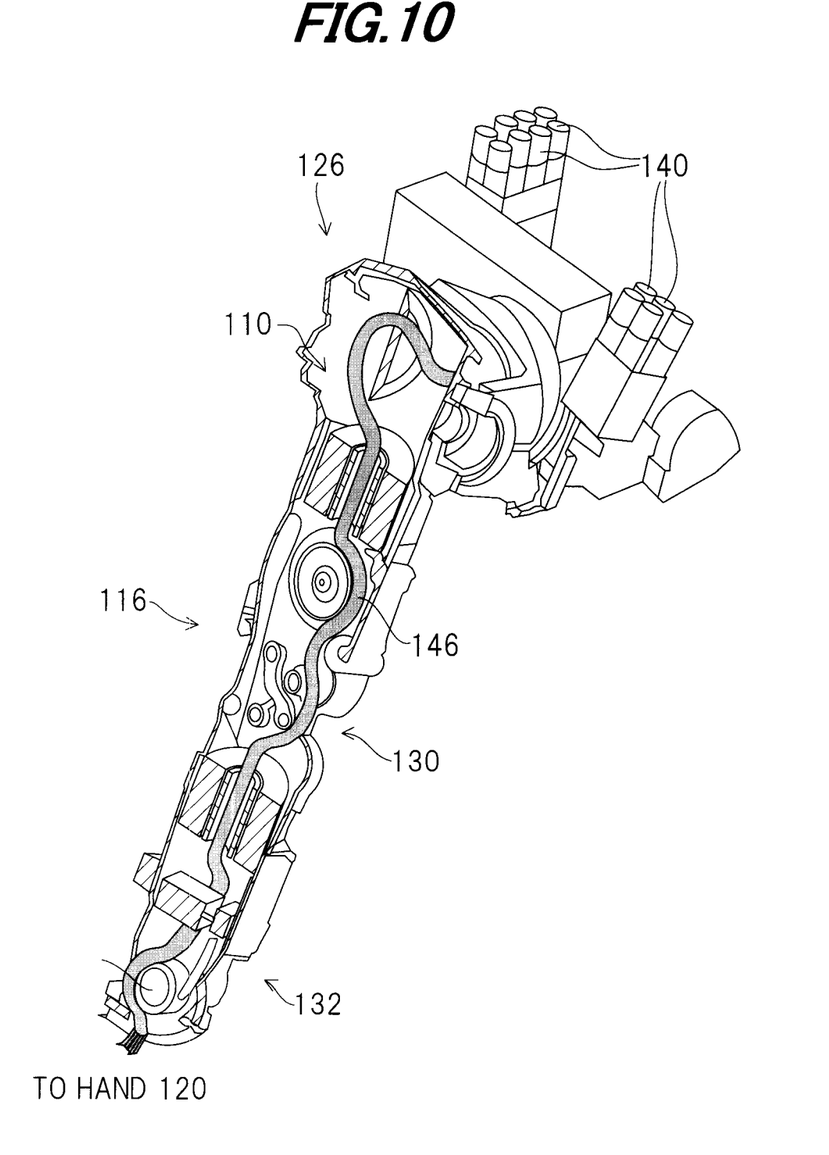
FIG. 10 is a partial cross-sectional perspective view of an arm and the like of the robot shown in FIG. 9, when it is removed from a main body and viewed from the left front.
Figure 11:
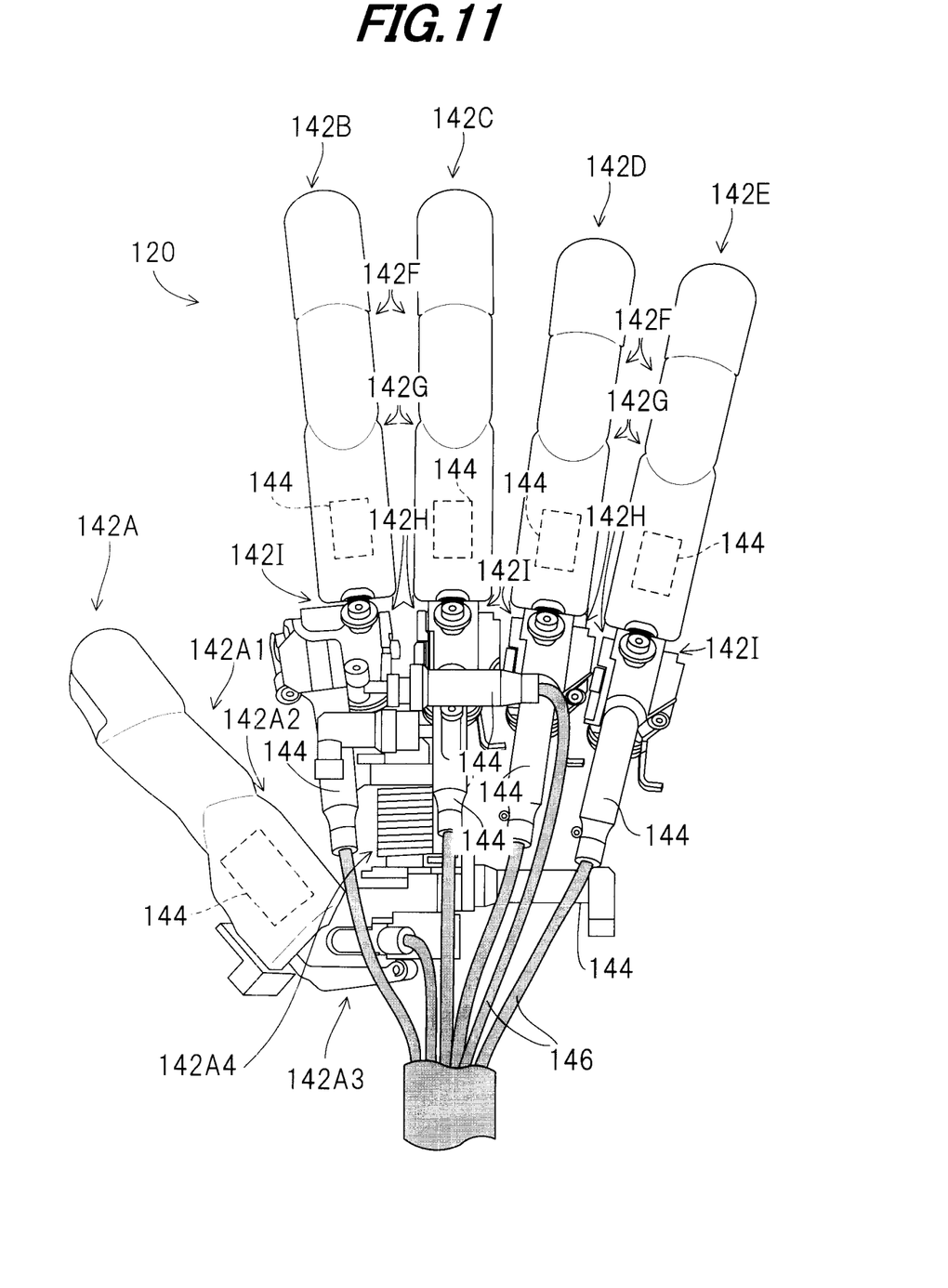
FIG. 11 is an enlarged plane view of a hand shown in FIG. 9.

FIG. 3 is a schematic view showing a joint mechanism according to a second embodiment of the invention, FIG. 4 is a perspective view schematically showing a second link of FIG. 3, FIG. 5 is a cross-sectional view taken along line V-V of FIG. 3, FIG. 6 is a cross-sectional view taken along line VI-VI of FIG. 3, FIGS. 7 and 8 are explanatory views showing the joint mechanism shown in FIG. 3 that is rotated from an extended position to a bent position through a joint, and FIGS. 9 to 11 are explanatory views of a humanoid robot.

In the second embodiment, the joint mechanism according to the first embodiment is used in a hand of a humanoid robot having human-like shape.

For ease of understanding, the robot having the joint mechanism according to the second embodiment is first explained with reference to FIGS. 9 to 11. As illustrated, the robot (assigned by 100) comprises a legged mobile robot having two legs 102, i.e., right and left legs.

The legs 102 are connected to the bottom of a main body (trunk) 104 and each of the legs 102 is equipped with a thigh link 106, shank link 110, and foot 112. The thigh link 106 is connected to the body 104 through a hip joint. The hip joint is installed with three electric motors having a rotary shaft rotatable about the Z-axis (yaw axis), a rotary shaft rotatable about the Y-axis (pitch axis lying in the fore-aft direction of the robot 100), and a rotary shaft rotatable about the X-axis (roll axis lying in the lateral direction of the robot 100).

The thigh link 106 and shank link 110 are interconnected by a knee joint and the shank link 110 and foot 112 are interconnected by a foot joint. The knee joint is installed with an electric motor having a rotary shaft rotatable about the Y-axis, while the foot joint is installed with electric motors having rotary shafts rotatable about the Y-axis and X-axis.

A head 114 is connected to the top of the body 104 and two arms (links) 116, i.e., right and left arms are connected to the sides of the body 104. Hands (end effectors) 120 are connected to the distal ends of the right and left arms 116.

Each of the arms 116 is equipped with an upper arm link 122 and a forearm link 124. The upper arm link 122 is connected to the body 104 through a shoulder joint 126. The upper arm link 122 and forearm link 124 are interconnected by an elbow joint 130, and the forearm link 124 and hand 120 are interconnected by a wrist joint 132.

The shoulder joint 126 is installed with three electric motors having a rotary shaft rotatable about Y-axis, a rotary shaft rotatable about the X-axis, and a rotary shaft rotatable about the Z-axis. The elbow link 130 is installed with an electric motor having a rotary shaft rotatable about the Y-axis. The wrist joint 132 is installed with three electric motors respectively having a rotary shaft rotatable about the Z-axis, a rotary shaft rotatable about the Y-axis, and a rotary shaft rotatable about the X-axis.

A housing unit 134 is mounted on the back of the body 104 to accommodate therein an Electronic Control Unit (ECU) 136, a battery (not shown), etc. The robot 100 is covered by a cover for protecting the internal structure. The ECU 136 has a microcomputer including a CPU, input/output circuit, ROM, RAM and other devices, and controls the operations of the motors of the legs 102, etc., to move the robot 100, while controlling the operations of the motors of the arms 116.

FIG. 10 is a partial cross-sectional perspective view of the right arm 116 and the like shown in FIG. 9, when it is removed from the body 104 and viewed from the left front of the robot 100. In FIG. 10, for ease of understanding, the drawing is illustrated with the cover for protecting the internal structure, and the like, appropriately removed.

As shown in FIG. 10, the robot 100 has thirteen driving hydraulic pressure cylinders (hydraulic pressure cylinders) 140 installed near the shoulder joint 126 of the arm 116 to supply operating hydraulic pressure. The thirteen cylinders 140 are divided into a first unit in which pairs of cylinders are arranged in four rows in parallel, and a second unit in which two cylinders and three cylinders are arranged in parallel.

As illustrated, each of the cylinders 140 has a substantially cylindrical shape and accommodates operating fluid (operating oil), a piston (not shown), etc. The piston is connected to an electric motor (not shown) through a pulley, etc.

FIG. 11 is an enlarged plane view of the hand 120 shown in FIG. 9.

The hand 120 that is formed to resemble a human hand includes five finger mechanisms 142 having bending and extending function, i.e., a thumb mechanism 142A, index finger mechanism 142B, middle finger mechanism 142C, ring finger mechanism 142D and little finger mechanism 142E.

The thumb mechanism 142A has, in order from the fingertip, an IP joint (thumb interphalangeal joint) 142A1, MP joint (thumb metacarpophalangeal joint) 142A2, CM1 joint (thumb carpometacarpal joint) 142A3 and CM2 joint (thumb carpometacarpal joint) 142A4.

Although not illustrated, each of the IP joint 142A1, MP joint 142A2, CM1 joint 142A3 has a rotary shaft that works to rotate the thumb mechanism 142A toward the palm side, while the CM2 joint 142A4 has a rotary shaft whose axis line is arranged to cross the axis lines of the above rotary shafts and works to rotate the thumb mechanism 142A to face the finger pad side of the other four finger mechanisms 142B to 142E.

Each of the index finger mechanism 142B, middle finger mechanism 142C, ring finger mechanism 142D and little finger mechanism 142E has, in order from the finger tip, a DIP joint (distal interphalangeal joint) 142F, PIP joint (proximal interphalangeal joint) 142G, MP1 joint (metacarpophalangeal joint) 142H and MP2 joint (metacarpophalangeal joint) 142I.

Driven hydraulic pressure cylinders (rotating force provider) 144 of the same number as the thirteen driving hydraulic pressure cylinders are separately installed at phalangeal members of the finger mechanisms 142 and a base of the hand 120. The driven hydraulic pressure cylinders 144 are supplied with operating hydraulic pressure (oil pressure) from the driving hydraulic pressure cylinders 140 through hydraulic pressure supply tubes 146. Note that one of the driven hydraulic pressure cylinders 144 and seven of the hydraulic pressure supply tubes 146 are not illustrated in FIG. 11.

The driven hydraulic pressure cylinder 144 includes a piston that is movably accommodated in the interior and a rod connected to the piston, and is configured so that, upon being supplied with operating hydraulic pressure from the driving hydraulic pressure cylinder 144, the piston is moved forward and the rod is moved forward accordingly, while, when operating hydraulic pressure is sucked (discharged) to the driving hydraulic pressure cylinder 144, the piston is moved backward and the rod is moved backward accordingly.

As described later with reference to FIG. 3, etc., the DIP joints 142F, PIP joints 142G and MP1 joints 142H have rotary shafts (joints) that rotate finger mechanisms 142 toward the palm side. The CM2 joint 142A4 of the thumb mechanism 142A and the MP2 joints 142I of the other finger mechanisms 142B to 142E have rotary shafts that are rotated in directions making the finger mechanisms 142 move closer to and away from one another.

In the thus-configured hand 120, when operating hydraulic pressure is supplied from the driving hydraulic pressure cylinders 140 to the driven hydraulic pressure cylinders 144 and discharged from the driven hydraulic pressure cylinders 144 to the driving hydraulic pressure cylinders 140, piston rods of the driven hydraulic pressure cylinders 144 are extended and contracted in response thereto and the corresponding joints are driven (extended and bent), whereby the hand 120 can carry out operations such as grasping an object, pointing in a desired direction, etc.

Details of the configuration of the hand 120, driving hydraulic pressure cylinders 140, driven hydraulic pressure cylinders 144 and the like are explained in Japanese Laid-Open Patent Application No. 2010-264546 proposed by the applicant earlier and the further explanation is omitted here.

On the premise of the above configuration, the explanation on FIGS. 3 to 8 will be resumed. Note that, in the second embodiment, constituent elements corresponding to those of the first embodiment are assigned by the same symbols as those in the first embodiment and suffixed with a, and their detailed explanation will be omitted as much as possible.

The joint mechanism according to the second embodiment has first to sixth links 12a, 14a, 24a, 32a, 36a, 40a similarly to the first embodiment, and they are used as joint members constituting a proximal phalangeal member and intermediate phalangeal member of any of the five finger mechanisms 142, for instance, the index finger mechanism 142B.

FIG. 3 is a schematic view showing a joint mechanism 10a including a first joint member (assigned by 50) constituting the proximal phalangeal member and a second joint member (assigned by 52) constituting the intermediate phalangeal member, etc.

As shown in the drawing, the first joint member 50 has the first link 12a, a first joint member cover 54 that covers the first link 12a, and the like, while the second joint member 52 has the second link 14a, a second joint member cover 56 that covers the second link 14a, and the like.

The first link 12a of the first joint member 50 is connected to the hand 120 via a seventh rotary shaft (joint) 60 and the second link 14a of the second joint member 52 is connected to a third joint member 64 constituting a distal phalangeal member via an eighth rotary shaft (joint) 62.

Reference numeral 66 indicates joint covers disposed around the rotary shafts (joints) 16a, 60, 62. The covers 54, 56, 66 are made of resin material such as urethane rubber and the first to sixth links 12a, 14a, 24a, 32a, 36a, 40a, etc., are made of rigid body like metal.

Thus, the joint mechanism 10a according to the second embodiment has at least one joint member (second joint member 52) connected to a connectable member (first joint member 50) via a joint (first rotary shaft 16a) to be rotatable in a range between the extended position and bent position.

In the first joint member 50, similarly to the first embodiment, the first link 12a and second link 14a are composed of case members. Since the first link 12a also functions as a cylinder body of a driven hydraulic pressure cylinder 144a, it has a liquid-tight cylindrical shape.

FIG. 4 is a perspective view schematically showing the second link 14a. As shown in the drawing, the second link 14a comprises the case member having substantially omega (Ω) shape when viewed from the side, which is formed by folding a flat plate back at one side (for example, the upper side in FIG. 3, etc.) and whose opening side is positioned at the bottom.

One end (at the right in FIG. 3, etc.) of the second link 14a is connected to the first link 12a via the first rotary shaft (joint) 16a to be relatively rotatable. As shown in FIGS. 5 and 6, a distance between the front plate and rear plate of the first link 12a is made smaller than that of the second link 14a. Specifically, a part of the first link 12a is placed inside the second link 14a and the links 12a, 14a are together penetrated by the first rotary shaft 16a so that they can be rotated relative to each other via the first rotary shaft 16a.

As shown in FIGS. 7 and 8, also in the joint mechanism 10a according to the second embodiment, the first link 12a and second link 14a of the first and second joint members 50, 52 are interconnected via the first rotary shaft 16a to be rotatable in a range between the extended position and fully bent position.

One side of the second link 14a, i.e., the lower portion thereof in FIG. 3, etc., is locally formed with a recess 141a at a position between the bottom of the second link 14a and the first rotary shaft 16a. To be more specific, the second joint member cover 56 covering the second link 14a is partly removed and that position is formed with the recess 141a. Thus, the remaining portion 561 of the second joint member cover 56 and the recess 141a cover the second joint member 52.

As shown in FIGS. 7 and 8, the recess 141a is gradually overlapped with (or closed by) the first link 12a (in other words, the recess 141a is moved toward the interior of the second joint member cover 56) as the second link 14a is rotated relative to the first link 12a about the first rotary shaft 16a from the extended position to the bent position, and when the first and second links 12a, 14a are relatively rotated to the position shown in FIG. 8, the recess 141a eventually reaches a position to be closed or covered by the first link 12a.

The joint mechanism 10a according to the second embodiment also includes a movable cover (sixth link 40a) that covers the recess 141a when the second link 14a is positioned to establish the extended position relative to the first link 12a, and a movement mechanism 20a that operates the movable cover to move toward the interior of the second link 14a after passing the recess 141a as the second link 14a is rotated relative to the first link 12a from the extended position (shown in FIG. 3) to the bent position (shown in FIGS. 7 and 8).

The movement mechanism 20a has a third link 24a that is connected in the interior of the second link 14a with the other end (at the left in FIG. 3, etc.) of the second link 14a on the opposite side from the aforementioned one end thereof to be relatively rotatable via a second rotary shaft 22a, a fourth link 32a that is connected at its one end (at the left in FIG. 3, etc.) with the third link 24a to be relatively rotatable via a third rotary shaft 26a positioned away from the second rotary shaft 22a by a predetermined distance and at its other end (at the right in FIG. 3, etc.) with the first link 12a to be relatively rotatable via a fourth rotary shaft 30a positioned away from the first rotary shaft 16a by a distance equivalent to the predetermined distance, and a fifth link 36a that is connected at its one end (at the right in FIG. 3, etc.) with the second link 14a to be relatively rotatable via a fifth rotary shaft 34a.

As shown in FIG. 6, similarly to the first and second links 12a, 14a, the third link 24a is also composed of two relatively-small (short) plate-shaped members including the front and rear plates. As shown in FIG. 5, the other end of the fourth link 32a is placed between the plates of the first link 12a and penetrated together with the first link 12a by the fourth rotary shaft 30a, so that the fourth link 32a is connected to the first link 12a to be rotatable relative thereto via the fourth rotary shaft 30a. Also, the fourth link 32a comprises a member having a substantially fork-like shape when viewed from the side, which has one plate in the vicinity of the point of connection with the third link 24a, as shown in FIG. 7. As shown in FIG. 3, the one end of the fifth link 36a is penetrated together with the second link 14a by the fifth rotary shaft 34a.

As mentioned in the foregoing, the movable cover includes the sixth link 40a connected to the fifth link 36a and first link 12a. The sixth link (movable cover) 40a is connected at its one end (at the left in FIG. 3, etc.) with the fifth link 36a via a sixth rotary shaft 42a to be relatively rotatable and at its other end (at the right in FIG. 3, etc.) with the first link 12a via the fourth rotary shaft 30a to be relatively rotatable. Consequently, the sixth link 40a is configured to cover the recess 141a when the second link 14a is positioned to establish the extended position.

Although not illustrated, the sixth link (movable cover) 40a comprises a wide plate member having width substantially equivalent to a distance between the front and rear plates of the second link 14a when viewed from the side, and the other end of the sixth link 40a is formed with a circular portion. The circular portion is placed between the two plates of the first link 12a to be penetrated therewith by the fourth rotary shaft 30a so that the sixth link 40a is connected to the first link 12a to be relatively rotatable. When the first and second links 12a, 14a establish the extended position, the sixth link 40a covers the recess 141a.

The circular portion of the sixth link (movable cover) 40a at its other end is continuously formed with a semicircular cover (rotary shaft cover) 400a around the fourth rotary shaft 30a so that the cover 400a covers the bottom side (in FIG. 3, etc.) of the fourth rotary shaft 30a facing the exterior of the first link 12a.

As shown in FIG. 5, the cover 400a has width substantially equivalent to the distance between the two plates of the first link 12a in the axial direction (in the thickness direction of the paper) in the surroundings of the fourth rotary shaft 30a. Consequently, the cover 400a is configured to cover a gap between the two plates of the first link 12 on the bottom side in the vicinity of the fourth rotary shaft 30a. A spring 300a is disposed around the fourth rotary shaft 30a to urge the second link 14a toward the extended position.

The joint mechanism 10a further includes the aforementioned driven hydraulic pressure cylinder 144 (rotating force provider 44a) that, in order to relatively rotate the links to the bent position, rotates the fourth link 32a about the fourth rotary shaft 30a in a predetermined direction (which is counterclockwise in FIG. 3, etc., in this case and clockwise in the case where the links are operated back to the extended position) so as to rotate the third link 24a through the second rotary shaft 22a in the same direction as the predetermined direction (counterclockwise).

As mentioned above, the first link 14a also functions as the cylinder body of the driven hydraulic pressure cylinder 144. Specifically, the driven hydraulic pressure cylinder 144 is accommodated in the first link 14a and equipped with a piston 1442 that reciprocates in the inside of the cylinder body 1441 in response to supplied hydraulic pressure, and a rod 1443 connected to the piston.

The rod 1443 of the driven hydraulic pressure cylinder 144 is connected to the fourth link 32a through an engagement hole 320a. The driven hydraulic pressure cylinder 144 serves as an actuator that can rotate the second link 14a through the third link 24a in the same direction as the predetermined direction by reciprocating (moving forward and backward) in the cylinder along its axis direction to move the fourth link 32a forward and backward.

With the above configuration, as shown in FIGS. 7 and 8, when the fourth link 32a is rotated in the predetermined direction by the hydraulic pressure cylinder 44a, the movement mechanism 20a rotates the second link 14a through the third link 24a in the same direction as the predetermined direction so that the recess 141a is moved into the interior of the first link 12a and the sixth link (movable cover) 40a is moved into the interior of the second link 14a after passing the recess 141a formed at the second link 14a, i.e., moved into the interior of the remaining portion 561 of the second joint member cover 56.

As shown in FIG. 3, etc., a space between the first link 12a and first joint member cover 54 is filled with filler 70 made of rigid urethane resin or the like to firmly fix the first link 12a in the interior of the first joint member cover 54 (for ease of illustration, the filler 70 is partially shown). In FIGS. 3 and 5, reference numeral 72 indicates a harness of a six-axis force sensor (not shown) housed in the third joint member 64.

Further, although not illustrated, also in the second embodiment, the joint mechanism 10a further includes a cross-link mechanism 46a having the second link 14a (link a) and fourth link 32a (link b), in which the second and fourth links 14a, 32a are interconnected by the fourth rotary shaft 30a (α) and third rotary shaft 26a (β) and also by the second rotary shaft 22a (γ) and first rotary shaft 16a (δ), and a line connecting the fourth rotary shaft 30a (α) and third rotary shaft 26a (β) crosses a line connecting the second rotary shaft 22a (γ) and first rotary shaft 16a (δ). In the thus-configured cross-link mechanism 46a, at least one of the second and fourth links 14a, 32a, more exactly the second link 14a comprises the case member.

Thus, in the second embodiment, in the joint mechanism 10a having the second joint member 52 connected to the first joint member (connectable member) 50 via the first rotary shaft (joint) 16a to be rotatable in a range between the extended position and the bent position, it is configured to have the sixth link (movable cover) 40a constituting a part of the second joint member cover 56 that covers the second joint member 52, and the sixth link 40a is moved into the interior of the remaining portion of the second joint member cover 56 as the second joint member 52 is rotated relative to the first joint member 50 from the extended position to the bent position. Since the second joint member 52 is covered by the sixth link 40a and the remaining portion 561 of the second joint member cover 56, it becomes possible to prevent the entry of foreign substances such as dust and water droplets into the interior at the second joint member 52 (and the first joint member 50).

Further, the sixth link 40a is connected to the fifth link 36a that is connected to the second joint member 52 to be relatively rotatable and also connected to the first joint member 50 to be relatively rotatable via the fourth rotary shaft 30a. With this, in addition to the above effect, it becomes possible to prevent the covers 66 from interfering with each other at the joint.

Further, it is configured to include the cover (rotary shaft cover) 400a that covers the fourth rotary shaft 30a, and the sixth link 40a is connected through the cover 400a to the first joint member 50 to be relatively rotatable via the fourth rotary shaft 30a. With this, in addition to the above effects, it becomes possible to prevent the entry of foreign substances such as dust and water droplets into the interior more reliably.

Further, similarly to the first embodiment, the second embodiment is configured to have the first and second links 12a, 14a, recess 141a, sixth link (movable cover) 40a and movement mechanism 20a, and the joint mechanism 10a constitutes a member of the robot, more exactly, the humanoid robot 100. With this, in the robot 100, it becomes possible to prevent the entry of foreign substances such as dust and water droplets into the interior of the joint mechanism 10a, while preventing the covers 66 from interfering with each other at the first rotary shaft 16a.

As stated above with reference to FIGS. 1 to 11, in the second embodiment, it is configured to have a joint mechanism (10a) having at least one joint member (second joint member 52) connected to a connectable member (first joint member 50) via a joint (first rotary shaft 10a) to be rotatable in a range between an extended position and a bent position, comprising: a movable cover (sixth link 40a) constituting a part of a joint member cover (second joint member cover 56) that covers the joint member, the movable cover being adapted to move into interior of remaining portion of the joint member cover as the joint member is rotated relative to the connectable member about the joint from the extended position to the bent position.

Since the second joint member 52 is covered by the movable cover (sixth link) 40a and the remaining portion 561 of the second joint member cover 56, it becomes possible to prevent the entry of foreign substances such as dust and water droplets into the interior at the joint.

Further, since the movable cover (sixth link 40a) is adapted to move into interior of remaining portion of the joint member cover (second joint member cover) 56 as the joint member (second joint member 52) is rotated relative to the connectable member (first joint member 50) to the bent position, it becomes possible to prevent the covers 66 from interfering with each other at the joint (first rotary shaft) 16a.

Further, the movable cover (sixth link 40a) is connected at its one end with a link (fifth link 36a) that is connected to the joint member (second joint member 52) to be relatively rotatable and at its other end with the connectable member (first joint member 50) to be relatively rotatable via a rotary shaft (fourth rotary shaft 30a). With this, in addition to the above effect, it becomes possible to reliably prevent the covers 66 from interfering with each other at the joint.

Further, the joint mechanism includes a rotary shaft cover (cover 400) adapted to cover the rotary shaft (fourth rotary shaft 30a), and the movable cover (sixth link 40a) is connected through the rotary shaft cover (cover 400) to the connectable member (first joint member 50) to be relatively rotatable via the rotary shaft (fourth rotary shaft 30a). With this, in addition to the above effect, it becomes possible to prevent the entry of foreign substances such as dust and water droplets into the interior more reliably.

In the first and second embodiments, it is configured to have a joint mechanism (10, 10a), comprising: a first link (12, 12a); a second link (14, 14a) connected at its one end with the first link to be relatively rotatable via a first rotary shaft (joint 16, 16a); a recess (141, 141a) locally formed at one side of the second link at a position between the second link and the first rotary shaft and is closed by the first link when the second link is rotated relative to the first link about the first rotary shaft from an extended position to a bent position (in the second embodiment, the recess 141a is locally formed at the second joint member cover 56 covering the second link between the second link and the first rotary shaft and is closed by the first link when the second link is rotated relative to the first link about the first rotary shaft from an extended position to a bent position); a movable cover (sixth link 40, 40a) adapted to cover the recess when the second link is positioned to establish the extended position relative to the first link; and a movement mechanism (20, 20a) adapted to operate the movable cover to move toward interior of the second link after passing the recess as the second link is rotated relative to the first link from the extended position to the bent position. With this, it becomes possible to prevent the entry of foreign substances such as dust and water droplets into the interior at the first and second links 10, 12, while preventing the covers 66 from interfering with each other at the joint.

Further, the movement mechanism (20, 20a) includes: a third link (24, 24a) connected to other end of the second link (14, 14a) on opposite side from the one end thereof to be relatively rotatable via a second rotary shaft (22, 22a); a fourth link (32, 32a) connected at its one end with the third link to be relatively rotatable via a third rotary shaft (26, 26a)

positioned away from the second rotary shaft and at its other end with the first link to be relatively rotatable via a fourth rotary shaft (32, 32a) positioned away from the first rotary shaft; and a fifth link (36, 36a) connected at its one end with the second link to be relatively rotatable via a fifth rotary shaft (34, 34a), and the movable cover includes a sixth link (40, 40a) connected at its one end with the fifth link to be relatively rotatable via a sixth rotary shaft (42, 42a) and at its other end with the first link to be relatively rotatable via the fourth rotary shaft; and the movement mechanism is adapted to operate the sixth link to move toward the interior of the second link after passing the recess when the fourth link is rotated about the fourth rotary shaft in a predetermined direction. With this, it becomes possible to prevent the entry of foreign substances such as dust and water droplets into the interior, while preventing the covers 66 from interfering with each other at the joint, more reliably.

Further, the other end of the sixth link (40, 40a) is connected to a cover (400, 400a) that covers surroundings of the fourth rotary shaft (30, 30a). With this, it becomes possible to prevent the entry of foreign substances such as dust and water droplets into the interior still more reliably.

Further, the movement mechanism (20, 20a) includes a rotating force provider (44, 44a) adapted to rotate the fourth link (32, 32a) in the predetermined direction. With this, in addition to the above effects, the structure can be made simple.

Further, the rotating force provider (44, 44a) includes an actuator (driven hydraulic pressure cylinder 144) adapted to rotate the second link (14, 14a) through the third link (24, 24a) by moving the fourth link (32, 32a) forward and backward. With this, in addition to the above effects, the structure can be made further simple.

Further, the second link 14, 14a comprises a case member adapted to accommodate the third to sixth links (24, 24a, 32, 32a, 36, 36a, 40, 40a) and a portion along with a line connecting the second rotary shaft (22, 22a) and the fourth rotary shaft (30, 30a) is opened and the opened portion is formed with the recess (141, 141a). With this, in addition to the above effects, the structure can be made further simple.

Further, the rotating force provider (actuator; driven hydraulic pressure cylinder 144) is able to be accommodated in interior of the first link. With this, in addition to the above effects, the structure can be made further simple.

Further, in a cross-link mechanism (46, 46a) having a link a (second link 14, 14a) and a link b (fourth link 32, 32a), the link a and the link b being interconnected by rotary shafts αβ (fourth rotary shaft 30, 30a, third rotary shaft 26, 26a) and γδ (second rotary shat 22, 22a, first rotary shaft 16, 16a), and a line connecting the αβ (fourth and third rotary shafts 30, 30a, 26, 26a) crossing a line connecting the γδ (second and first rotary shafts 22, 22a, 16, 16a), wherein one of the link a (second link 14, 14a) and the link b (fourth link 32, 32a), more specifically, the second link 14, 14a comprises a case member.

Since the cross-link mechanism 46, 46a can be accommodated in the case members, compared to the case where, for example, a cover (different from the first and second joint covers 52, 54) is installed around the cross-link mechanism 46, 46a, the accommodating space can be easily ensured and it becomes possible to enhance flexibility in design.

Further, the cross-link mechanism (46, 46a) recited above is provided. With this, in addition to the above effects, it becomes possible to enhance flexibility in design of the joint mechanism 10, 10a.

Further, it is configured to be a robot (100), wherein the joint mechanism (10, 10a) recited above or the cross-link mechanism recited above is provided. With this, it becomes possible to prevent the entry of foreign substances such as dust and water droplets into the interior of the robot 100, while preventing the covers 66 from interfering with each other at the joints.

Further, the robot (100) is a humanoid type robot and a finger mechanism (142) of a hand (120) or a leg (112) of the robot has the joint mechanism (10, 10a) or the cross-link mechanism (46, 46a). With this, it becomes possible to prevent the entry of foreign substances such as dust and water droplets into the interior at the hands and feet of the humanoid robot, while preventing the covers 66 from interfering with each other at the joints.

It should be noted that, in the foregoing, although the joint mechanism 10a is applied to the finger mechanism 142 of the hand 120 of the robot 100, the foot 112 may be configured to have finger mechanisms having the joint mechanisms, and also the joint mechanism can be applied to a fixed-type industrial robot, etc.

Japanese Patent Application No. 2011-239162 filed on Oct. 31, 2011 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A joint mechanism having at least one joint member connected to a connectable member via a joint to be rotatable in a range between an extended position and a bent position, comprising:
    a movable cover constituting a part of a joint member cover that covers the joint member, the movable cover being adapted to move into an interior of a remaining portion of the joint member cover as the joint member is rotated relative to the connectable member about the joint from the extended position to the bent position,
    wherein the movable cover has:
        one end connected with a link that is connected to the joint member to be relatively rotatable; and
        another end connected with the connectable member to be relatively rotatable via a rotary shaft.

2. The joint mechanism according to claim 1, further including:
    a rotary shaft cover adapted to cover the rotary shaft,
    and the movable cover is connected through the rotary shaft cover to the connectable member to be relatively rotatable via the rotary shaft.

3. A joint mechanism, comprising:
    a first link;
    a second link having one end connected with the first link to be relatively rotatable via a first rotary shaft;
    a recess locally formed at one side of the second link at a position between the second link and the first rotary shaft and is closed by the first link when the second link is rotated relative to the first link about the first rotary shaft from an extended position to a bent position;
    a movable cover adapted to cover the recess when the second link is positioned to establish the extended position relative to the first link; and
    a movement mechanism adapted to operate the movable cover to move toward an interior of the second link after passing the recess as the second link is rotated relative to the first link from the extended position to the bent position.

4. The joint mechanism according to claim 3, wherein the movement mechanism includes:
- a third link connected to other end of the second link on opposite side from the one end thereof to be relatively rotatable via a second rotary shaft;
- a fourth link having one end connected with the third link to be relatively rotatable via a third rotary shaft positioned away from the second rotary shaft and the fourth link having another end connected with the first link to be relatively rotatable via a fourth rotary shaft positioned away from the first rotary shaft; and
- a fifth link having one end connected with the second link to be relatively rotatable via a fifth rotary shaft,
- and the movable cover includes a sixth link having one end connected with the fifth link to be relatively rotatable via a sixth rotary shaft and the sixth link having another end connected with the first link to be relatively rotatable via the fourth rotary shaft; and
- the movement mechanism is adapted to operate the sixth link to move toward the interior of the second link after passing the recess when the fourth link is rotated about the fourth rotary shaft in a predetermined direction.

5. The joint mechanism according to claim 4, wherein the other end of the sixth link is connected to a cover that covers surroundings of the fourth rotary shaft.

6. The joint mechanism according to claim 4, wherein the movement mechanism includes a rotating force provider adapted to rotate the fourth link in the predetermined direction.

7. The joint mechanism according to claim 6, wherein the rotating force provider includes an actuator adapted to rotate the second link through the third link by moving the fourth link forward and backward.

8. The joint mechanism according to claim 4, wherein the second link comprises a case member adapted to accommodate the third to sixth links and a portion along with a line connecting the second rotary shaft and the fourth rotary shaft is opened and the opened portion is formed with the recess.

9. The joint mechanism according to claim 6, wherein the rotating force provider is able to be accommodated in an interior of the first link.

* * * * *